United States Patent
Wang et al.

(10) Patent No.: US 12,216,618 B2
(45) Date of Patent: Feb. 4, 2025

(54) SYSTEM AND A METHOD FOR THE CLASSIFICATION OF SENSITIVE DATA ELEMENTS IN A FILE

(71) Applicant: SECURITI, Inc., Coyote, CA (US)

(72) Inventors: Xiaolin Wang, San Jose, CA (US); Michael Rinehart, San Jose, CA (US)

(73) Assignee: SECURITI, Inc., Coyote, CA (US)

( * ) Notice: Subject to any disclaimer, the term of this patent is extended or adjusted under 35 U.S.C. 154(b) by 0 days.

(21) Appl. No.: 18/156,439

(22) Filed: Jan. 19, 2023

(65) Prior Publication Data
US 2023/0237018 A1    Jul. 27, 2023

Related U.S. Application Data

(60) Provisional application No. 63/301,572, filed on Jan. 21, 2022.

(51) Int. Cl.
*G06F 16/16*     (2019.01)
*G06F 21/62*     (2013.01)
(Continued)

(52) U.S. Cl.
CPC .......... *G06F 16/16* (2019.01); *G06F 21/6227* (2013.01); *G06N 3/0475* (2023.01); *G06N 3/08* (2013.01)

(58) Field of Classification Search
None
See application file for complete search history.

(56) References Cited

U.S. PATENT DOCUMENTS 10,867,073 B1 *  12/2020  Yang ..................... G06F 21/604
11,177,957 B2 *  11/2021  Visegrady ............. H04L 9/3239
(Continued)

FOREIGN PATENT DOCUMENTS

CN       108304835 A     7/2018
WO     2022076234 A1     4/2022

OTHER PUBLICATIONS

Nicolas Papernot and Patrick McDaniel Department of Computer Science and Engineering, Pennsylvania State University; Deep k-Nearest Neighbors: Towards Confident, Interpretable and Robust Deep Learning; Mar. 13, 2018.

*Primary Examiner* — Kim T Nguyen
(74) *Attorney, Agent, or Firm* — Jason C. Cameron

(57) ABSTRACT

A system and a method for classifying sensitive data elements in a file is provided. The method includes receiving and converting, the unstructured data file into a machine-readable format and generating, a plurality of sensitive data features. The plurality of sensitive data features represents single element of the sensitive data. The method includes generating, a plurality of adjacent elements corresponding to the single elements of the sensitive data and generating a plurality of feature categories. The method includes aggregating, the plurality of adjacent node features and the plurality of edge features. The method includes calculating and concatenating the plurality of aggregated adjacent nodes features and the plurality of aggregated edge features. The method includes comparing, the distance of the sensitive data from all of the adjacent sensitive data. The method includes classifying and predicting, the sensitive data to be a true positive or false positive sensitive data by using machine learning.

16 Claims, 7 Drawing Sheets

(51) Int. Cl.
*G06N 3/0475* (2023.01)
*G06N 3/08* (2023.01)

(56) References Cited

U.S. PATENT DOCUMENTS

| | | | | |
|---|---|---|---|---|
| 11,574,151 | B2* | 2/2023 | Wang | G06V 10/82 |
| 2014/0347659 | A1* | 11/2014 | Murphy | G01J 3/0218 |
| | | | | 356/300 |
| 2017/0366513 | A1* | 12/2017 | Kumaran | H04L 63/0421 |
| 2020/0396075 | A1* | 12/2020 | Visegrady | H04L 9/3234 |
| 2021/0350023 | A1 | 11/2021 | Enuka et al. | |
| 2021/0383159 | A1* | 12/2021 | Wang | G06V 30/40 |
| 2023/0237018 | A1* | 7/2023 | Wang | G06N 3/08 |
| | | | | 707/737 |
| 2024/0258336 | A1* | 8/2024 | Wang | G02F 1/1345 |
| 2024/0280850 | A1* | 8/2024 | Xi | G02F 1/136286 |
| 2024/0353725 | A1* | 10/2024 | Li | G02F 1/136286 |

* cited by examiner

| The Bancorp | ACH LOAN PAYMENT AUTHORIZATION<br>409, Silverside road<br>Wilmington DE, 19809 |
|---|---|

| Part 1: Loan account with Us ("Transfer to") ||
|---|---|
| Loan Account name: Dean Scharmen | Loan Account Number: 0419121065 |
| Part 2: Other financial institution information ("Transfer from") ||
| Account name: Paul Bellhorn | Account Number: 01 24002201003 |
| Account type: Personal:☐Checking or☐Saving    Commercial:☐Checking of☐ Saving ||
| Financial Institution Name: Bank of America Corp. | ABA Routing Number: 265473825 |
| Financial Institution Address: 100 North Tryon Street, Charlotte, NC 28255 ||

Ernest D. Prentice Ph.D.
Chair, Secretary's Advisory Committee on Human Research Protections
Associate Vice Chancellor for Academic Affairs And Regulatory Compliance
98730 Nebraska Medical Center Omaha, Nebraska 68198-7830

Dear Dr. Prentice:

I am writing to extend my appreciation to you and the Secretary's Advisory Committee on Human Research Protections for your recent recommendations.

The Committee clearly has given substantial thought to the implementation of the HHS protection of human subjects regulation at 45 CFR part 46, subpart D, which provide additional protections to children involved as subjects in research. The Department appreciates the Committee's observations on this important topic and, as usual, will give serious consideration to the Committee's recommendations.

Thank you and the Committee for your dedication and commitment to the protection of human research subjects. I look forward to future updates.

Sincerely,

Michael O. Leavitt

FIG. 4

SYSTEM AND A METHOD FOR THE CLASSIFICATION OF SENSITIVE DATA ELEMENTS IN A FILE

EARLIEST PRIORITY DATE

This Application claims priority from a Provisional patent application filed in the United States of America having Patent Application No. 63/301,572, filed on Jan. 21, 2022, and titled "Improving the Classification of Personally-Identifiable Data Elements in Documents Using Location-Invariant, Context-Based Machine Learning."

FIELD OF INVENTION

Embodiments of a present disclosure relate to electronic text processing and more particularly a system and a method for the classification of sensitive data elements in a file.

BACKGROUND

A file is a document, containing text, images, and the like. A digital file is a file that is structured as a sequence of lines of electronic data. The file is processed for better functioning of the file and for better use of the processed data. File processing includes converting, manipulating, extracting, and classification of unstructured data into structured data. Data classification is the process of organizing data into categories that make it easy to retrieve, sort, and store for future use. Data classification provides way for an organization to determine and assign relative values to the data which the organization possesses. Data classification is helpful in data privacy in case of the classification of personal data, sensitive data, or confidential data. Data classification protects sensitive information of an individual or an enterprise.

Among various classification techniques, artificial neural networks (ANN), statistical approaches, and machine learning are the main methods. Extracting all the sensitive data from a file may require the extraction of all sensitive data. Automatic extraction of sensitive data has challenges like too many files in a queue to process without automation, more accuracy is required while extracting the sensitive data. The discovery of sensitive data may be accomplished using a data loss prevention (DLP) system, a file-based cloud application, and the like. However, such systems may have less accuracy rate. There is a need for a system that solves the accuracy problem by filtering out sensitive data with accuracy. There is a need for a system that provides scalability. Also, there is a need for a system that minimizes manual intervention.

Hence, there is a need for a system and a method for the classification of sensitive data elements in a file that addresses the aforementioned issues.

BRIEF DESCRIPTION

In accordance with an embodiment of the present disclosure, a system for classifying sensitive data elements in a file using machine learning is provided. The system includes a processing subsystem hosted on a server and configured to execute on a network to control bidirectional communications among a plurality of modules. The plurality of modules includes a receiving module, a conversion module, a machine learning module, a feature generation module, a feature calculation module, a conversion module, and a classification module. The receiving module is configured to receive an unstructured data file. The unstructured data file is a data source with an inconsistent structure of data organized in the form of unstructured forms and unstructured natural text. The conversion module is operatively coupled to the receiving module. The conversion module is configured to convert the unstructured data file into a machine-readable format. The machine learning module is operatively coupled to the conversion module wherein the machine learning module includes a feature generation module and a feature calculation module. The feature generation module is operatively coupled with the receiving module and configured to generate a plurality of sensitive data features. The plurality of sensitive data features represents single elements of the sensitive data. The feature generation module is also configured to generate a plurality of adjacent elements corresponding to the single elements of the sensitive data and analyze the relationship between the said single elements of the sensitive data and the plurality of adjacent elements. Further, the feature generation module is configured to generate a plurality of feature categories. The plurality of feature categories includes a plurality of node features, a plurality of adjacent node features, and a plurality of edge features. The feature calculation module is operatively coupled to the feature generation module, wherein the feature calculation module is configured to aggregate the plurality of adjacent node features and the plurality of edge features by calculating the average of the plurality of adjacent node features and a plurality of adjacent edge features. The feature calculation module also calculates the plurality of aggregated adjacent nodes features and the plurality of aggregated edge features for one or more adjacent nodes and adjacent node edges. Further, the feature calculation module is configured to concatenate the plurality of aggregated adjacent nodes features and the plurality of aggregated edge features with the features of the individual adjacent node and the individual edge. The comparison module is operatively connected to the feature calculation module. The comparison module is configured to compare the distance of the sensitive data from all of the adjacent sensitive data to calculate the nearest adjacent sensitive data and select the plurality of adjacent node features. The classification module is operatively coupled with the feature generation module. The classification module is configured to classify the sensitive data and predicts the sensitive data to be a true positive or false positive sensitive data by using machine learning, in response to receiving the generated sensitive data from the feature generation module. The false positive sensitive data is filtered out and the true positive personal represents accurate sensitive data.

In accordance with an embodiment of the present disclosure, a method for classifying sensitive data elements in a file is provided. The method includes receiving, by a receiving module of a processing subsystem, an unstructured data file wherein the unstructured data file is a data source with the inconsistent structure of data organized in the form of unstructured forms and unstructured natural text. The method also includes converting, the unstructured data file into machine-readable format. Further, the method includes generating, by a feature generation module of the processing subsystem, a plurality of sensitive data features, wherein the plurality of sensitive data features represents single elements of the sensitive data. Furthermore, the method includes generating, by a feature generation module of the processing subsystem, a plurality of adjacent elements corresponding to the single elements of the sensitive data and analysing the relationship between the said single elements of the sensitive data and the plurality of adjacent elements. Furthermore, the method includes generating, by a feature generation module of the processing subsystem, generate a plurality of feature categories, wherein the plurality of feature categories includes a plurality of node features, a plurality of adjacent node features, and a plurality of edge features. Furthermore, the method includes aggregating, by a feature calculation module of the processing subsystem, the plurality of adjacent node features and the plurality of edge features by calculating the average of the plurality of adjacent node features and a plurality of adjacent edge features. Furthermore, the method includes calculating, by a feature calculation module of the processing subsystem, the plurality of aggregated adjacent nodes features and the plurality of aggregated edge features for one or more adjacent nodes and adjacent node edges. Furthermore, the method includes concatenating, by a feature calculation module of the processing subsystem, the plurality of aggregated adjacent nodes features and the plurality of aggregated edge features with the features of the individual adjacent node and the individual edge. Furthermore, the method includes comparing, by a comparison, the module of the processing subsystem, the distance of the sensitive data from all of the adjacent sensitive data to calculate the nearest adjacent sensitive data and select the plurality of adjacent node features. Furthermore, the method includes classifying and predicting, by a classification module of the processing subsystem, the sensitive data and predicts the sensitive data to be a true positive or false positive sensitive data by using machine learning, in response to receiving the generated sensitive data from the feature generation module, wherein the false positive sensitive data is filtered out and the true positive personal represents accurate sensitive data.

In accordance with an embodiment of the present disclosure, a method for classifying sensitive data elements using machine learning model is provided. The method includes representing a plurality of attributes corresponding to the sensitive data by using the plurality of node features. The method also includes representing a plurality of attributes corresponding to the adjacent sensitive data by using the plurality of adjacent node features. Further, the method includes representing a plurality of attributes corresponding to the sensitive data node and the adjacent sensitive data nodes by using a plurality of edge features.

In accordance with an embodiment of the present disclosure, a non-transitory computer-readable medium storing a computer program that, when executed by a processor, causes the processor to perform a method for the classification of sensitive data elements in a file is provided. The method includes receiving, by a receiving module of a processing subsystem, an unstructured data file wherein the unstructured data file is a data source with the inconsistent structure of data organized in the form of unstructured forms and unstructured natural text. The method also includes converting, the unstructured data file into a machine-readable format. Further, the method includes generating, by a feature generation module of the processing subsystem, a plurality of sensitive data features, wherein the plurality of sensitive data features represents single elements of the sensitive data. Furthermore, the method includes generating, by a feature generation module of the processing subsystem, a plurality of adjacent elements corresponding to the single elements of the sensitive data and analysing the relationship between the said single elements of the sensitive data and the plurality of adjacent elements. Furthermore, the method includes generating, by a feature generation module of the processing subsystem, generate a plurality of feature categories, wherein the plurality of feature categories includes a plurality of node features, a plurality of adjacent node features, and a plurality of edge features. Furthermore, the method includes aggregating, by a feature calculation module of the processing subsystem, the plurality of adjacent node features and the plurality of edge features by calculating the average of the plurality of adjacent node features and a plurality of adjacent edge features. Furthermore, the method includes calculating, by a feature calculation module of the processing subsystem, the plurality of aggregated adjacent nodes features and the plurality of aggregated edge features for one or more adjacent nodes and adjacent node edges. Furthermore, the method includes concatenating, by a feature calculation module of the processing subsystem, the plurality of aggregated adjacent nodes features and the plurality of aggregated edge features with the features of the individual adjacent node and the individual edge. Furthermore, the method includes comparing, by a comparison, the module of the processing subsystem, the distance of the sensitive data from all of the adjacent sensitive data to calculate the nearest adjacent sensitive data and select the plurality of adjacent node features. Furthermore, the method includes classifying and predicting, by a classification module of the processing subsystem, the sensitive data and predicting the sensitive data to be a true positive or false positive sensitive data by using machine learning, in response to receiving the generated sensitive data from the feature generation module, wherein the false positive sensitive data is filtered out and the true positive personal represents accurate sensitive data.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 3 is an exemplary embodiment of the representation of an unstructured data form of FIG. 1 in accordance with an embodiment of the present disclosure;

FIG. 4 is an exemplary embodiment of the representation of an unstructured natural text data of data source which has no consistent structure as form templates files of FIG. 1 in accordance with an embodiment of the present disclosure;

FIG. 6 (*b*) illustrates the continued steps of the method for the classification of sensitive data of FIG. 6 (*a*) in accordance with an embodiment of the present disclosure.

Figure 1:
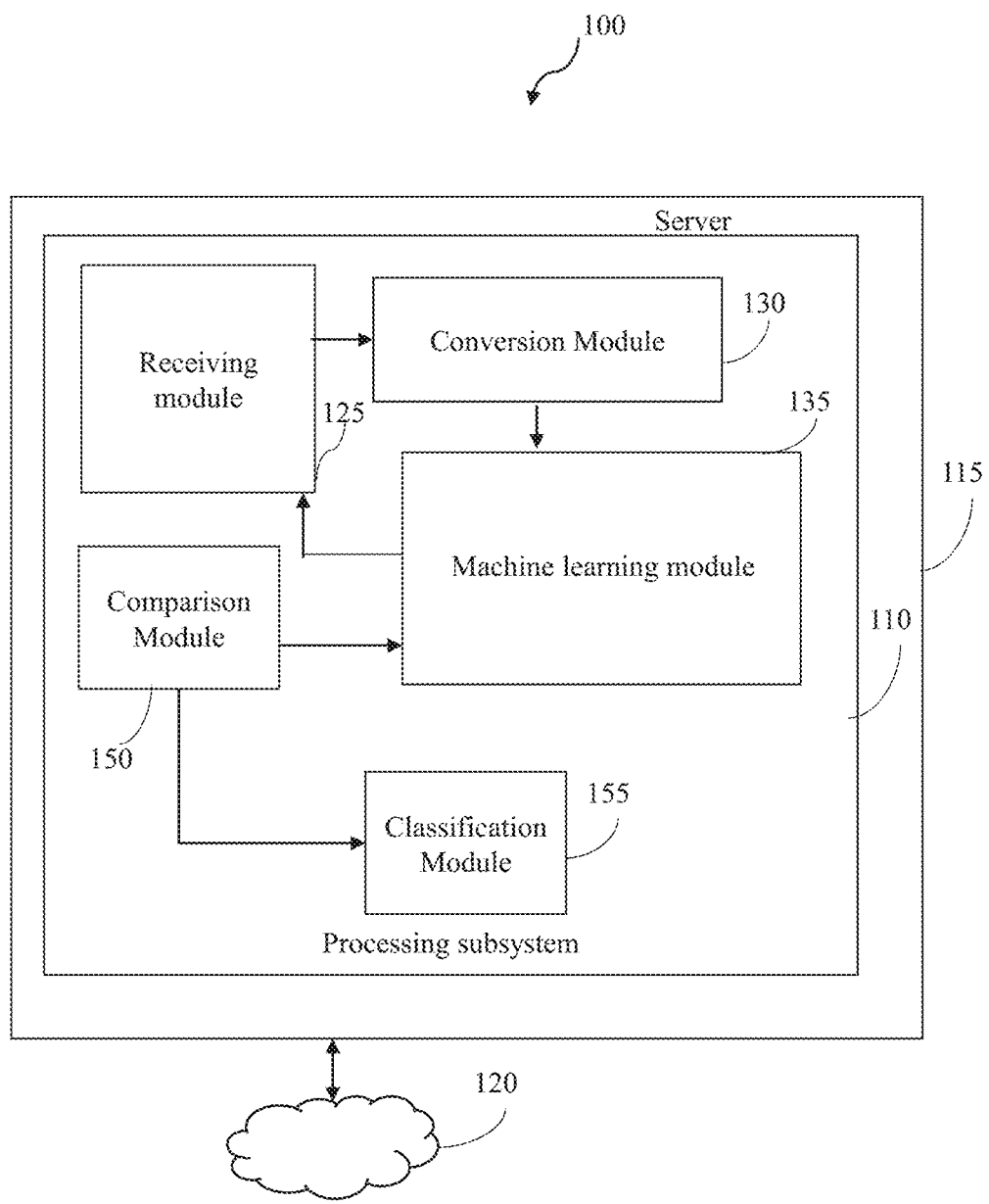
FIG. 1 is a block diagram representation of a system for classifying sensitive data elements in a file in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for classifying sensitive data elements in a file is provided. The system includes a processing subsystem hosted on a server and configured to execute on a network to control bidirectional communications among a plurality of modules. The processing subsystem includes a receiving module configured to receive an unstructured data file. The unstructured data file is a data source with an inconsistent structure of data organized in the form of unstructured forms and unstructured natural text. The processing subsystem includes a conversion module is operatively coupled to the receiving module. The conversion module is configured to convert the unstructured data file into a machine-readable format. The processing system also includes a machine learning module operatively coupled to the conversion module wherein the machine learning module includes a feature generation module operatively coupled with the receiving module and configured to generate a plurality of sensitive data features. The plurality of sensitive data features represents single elements of the sensitive data. The feature generation module is also configured to generate a plurality of adjacent elements corresponding to the single elements of the sensitive data and analyze the relationship between the said single elements of the sensitive data and the plurality of adjacent elements. Further, the feature generation module is configured to generate a plurality of feature categories. The plurality of feature categories includes a plurality of node features, a plurality of adjacent node features, and a plurality of edge features. The machine learning module includes a feature calculation module operatively coupled to the feature generation module. The feature calculation module is configured to aggregate the plurality of adjacent node features and the plurality of edge features by calculating the average of the plurality of adjacent node features and a plurality of adjacent edge features. The feature calculation module also calculates the plurality of aggregated adjacent nodes features and the plurality of aggregated edge features for one or more adjacent nodes and adjacent node edges. Further, the feature calculation module is configured to concatenate the plurality of aggregated adjacent nodes features and the plurality of aggregated edge features with the features of the individual adjacent node and the individual edge. The processing subsystem also includes a comparison module operatively connected to the feature calculation module. The comparison module is configured to compare the distance of the sensitive data from all of the adjacent sensitive data to calculate the nearest adjacent sensitive data and select the plurality of adjacent node features. Further, the processing subsystem includes a classification module operatively coupled with the feature generation module. The classification module is configured to classify the sensitive data and predicts the sensitive data to be a true positive or false positive sensitive data by using machine learning, in response to receiving the generated sensitive data from the feature generation module. The false positive sensitive data is filtered out and the true positive personal represents accurate sensitive data.

FIG. 1 is a block diagram representation of a system 100 for classifying sensitive data elements in a file in accordance with an embodiment of the present disclosure. The system 100 includes a processing subsystem 110. The processing subsystem 110 is hosted on a server 115. In one embodiment, the server 115 may be a cloud-based server. In another embodiment, the server 115 may be a local server 115. The processing subsystem 110 is configured to execute on a network 120 to control bidirectional communications among a plurality of modules. In one embodiment, the network 120 may include one or more terrestrial and/or satellite networks 120 interconnected to communicatively connect a user device to web server engine and a web crawler. In one example, the network 120 may be a private or public local area network (LAN) or wide area network, such as the internet.

Moreover, in another embodiment, the network 120 may include both wired and wireless communications according to one or more standards and/or via one or more transport mediums. In one example, the network 120 may include wireless communications or Bluetooth specification sets, LoRa (Long Range Radio) or another standard or proprietary wireless communication protocol. In yet another embodiment, the network 120 may also include communications over a terrestrial cellular network, including, a GSM (global system for mobile communications), CDMA (code division multiple access), and/or EDGE (enhanced data for global evolution) network. In one embodiment, the processing system includes a sensitive data feature generation module configured to generate sensitive data features by analysing the distance between the node text and the adjacent node text, wherein the adjacent node text acts as an anchor for the node and the edge features. The sensitive data feature is a true positive sensitive data provided that the sensitive data feature is a security number type and is associated with the anchor.

Further, the processing subsystem 110 includes a receiving module 125 configured to receive an unstructured data file, wherein the unstructured data file is a data source with an inconsistent structure of data organized in the form of unstructured forms and unstructured natural text. In one embodiment, the receiving module 125 is configured to receive at least one of the static sensitive data, the dynamic sensitive data, and the data source information. In one embodiment, the static sensitive data permanently replaces the sensitive data by altering the existing stored data. In one embodiment, the dynamic sensitive data replaces sensitive data in transit by leaving the original stored data intact and unaltered. In one embodiment, the data source information is the information about the location where the data that is being used originates from. In another embodiment, the location may be the initial location where physical information is first digitized, also even the most refined data may serve as a source, as long as another process accesses and utilizes it.

Further, the processing subsystem 110 includes a conversion module 130 operatively coupled to the receiving module 125. The conversion module 130 is configured to convert the unstructured data file into a machine-readable format. In one embodiment, the data file in the machine-readable format is a data file in a structured format that may be automatically read and processed by a computer.

Furthermore, the processing subsystem 110 includes a machine learning module 135 operatively coupled to the conversion module 130. In one embodiment, the machine learning module may include a plurality of machine learning rules. The machine learning rules are configured to determine a probability associated with the prediction of a sensitive data relating to a structured file, wherein the structured file is in a machine-readable format. The machine learning rules are configured to classify the file as containing sensitive data, based on the determined probability.

The machine learning module 135 is configured to recognize and determine the sensitive data features with one or more machine learning techniques. The one or more machine learning techniques may include, but are not limited to, linear regression, logistic regression, decision tree, SVM technique, naive Bayes technique, KNN technique, K-means, random forest technique, and the like.

The processing subsystem 110 also includes a comparison module 150 operatively connected to the feature calculation module 215. The comparison module is configured to compare the distance of the sensitive data from all of the adjacent sensitive data to calculate the nearest adjacent sensitive data and select the plurality of adjacent node features. In one embodiment, the comparison module 150 may generate sensitive data features by using at least one of a graph neural network 120 and a machine learning model. In on embodiment, the adjacent sensitive data may target data detection such as name detection and anchor detection such as name anchor detection. In one embodiment, for a given target sensitive data, its nearest adjacent data are found by comparing the distance of the sensitive data from all of its adjacent sensitive data and selecting the k closest ones. Different distance functions may be applied to the target-sensitive data. The plurality of node features, the plurality of adjacent node features, and the plurality of edge features are concatenated into a 1-dimensional feature vector F.

Moreover, the processing subsystem 110 includes a classification module 155 operatively coupled with the feature generation module 210, wherein the classification module is configured to classify the sensitive data and predicts the sensitive data to be a true positive or false positive sensitive data by using machine learning, in response to receiving the generated sensitive data from the feature generation module 210. The false positive sensitive data is filtered out and the true positive personal represents accurate sensitive data. In one embodiment, the classification module may generate sensitive data features by using at least one of a graph neural network and a machine learning model. In another embodiment, the classification module 155 classifies the sensitive data from the entire document, page, chunks, and features. In yet one embodiment, for the target sensitive data, the classification module 155 takes F (the 1-dimensional feature vector) generated by the comparison module 150 and predicts the sensitive data to be a true positive or false positive.

Figure 2:
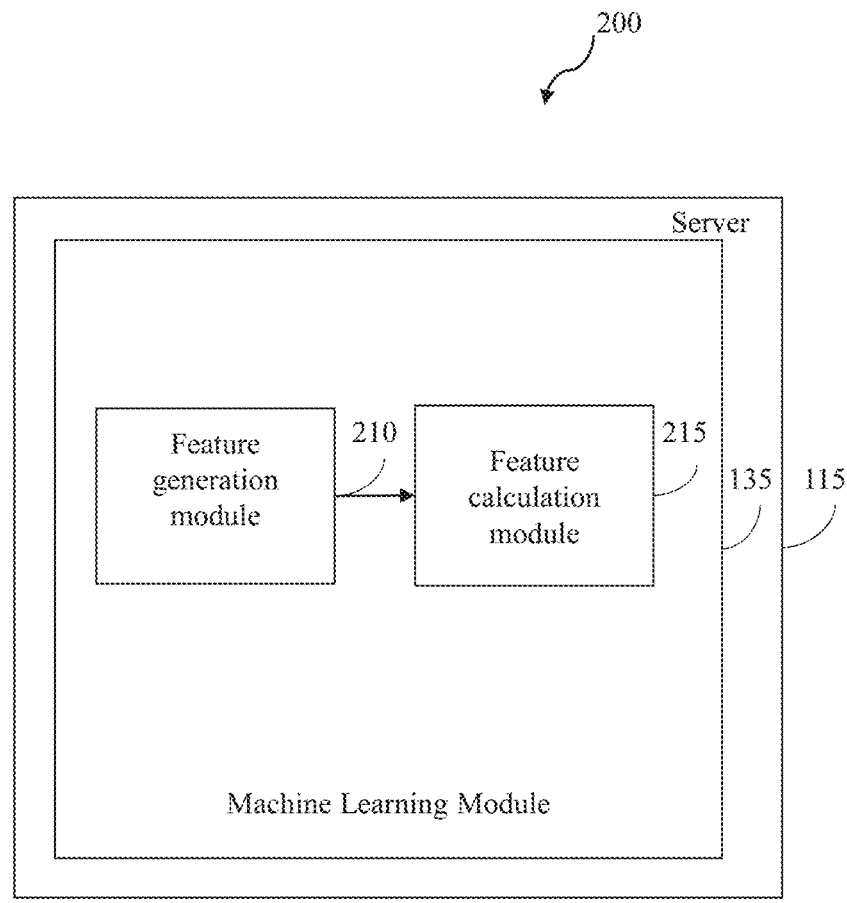
FIG. 2 a block diagram representation of a machine learning module of FIG. 1 in accordance with an embodiment of the present disclosure.

FIG. 2 is a block diagram representation of a machine learning module 135 of FIG. 1 in accordance with an embodiment of the present disclosure. Typically, the machine learning module 135 is trained by machine learning techniques/algorithms. The machine learning module 135 further includes a feature generation module 210 and a feature calculation module 215.

The feature generation module 210 is operatively coupled with the receiving module 125. The feature generation module 210 is configured to generate a plurality of sensitive data features, wherein the plurality of sensitive data features represents single elements of the sensitive data. The feature generation module 210 is also configured to generate a plurality of adjacent elements corresponding to the single elements of the sensitive data and analyze the relationship between the said single elements of the sensitive data and the plurality of adjacent elements. Further, the feature generation module 210 is configured to generate a plurality of feature categories, wherein the plurality of feature categories includes a plurality of node features, a plurality of adjacent node features, and a plurality of edge features. In one embodiment, the plurality of node features may represent the attribute regarding the sensitive data. In one embodiment, the plurality of adjacent node features represents the attribute regarding the adjacent sensitive data of the sensitive data.

In one embodiment, the plurality of edge features represents a plurality of attributes regarding the sensitive data node and related adjacent sensitive data nodes. In one embodiment, the feature generation module 210 generates sensitive data features by using at least one of a graph neural network and a machine learning model. In another embodiment, the feature generation module 210 generates a plurality of node features by analyzing the uniqueness and an identifiability score for each of the nodes based on the node type. The identifiability score represents correctness of the estimation of the node features. In one embodiment, the plurality of node features, the plurality of adjacent node features, and the plurality of edge features are concatenated into a one-dimensional feature vector, and wherein the feature vector is a vector containing multiple elements corresponding to the sensitive data feature.

The feature calculation module 215 is operatively coupled to the feature generation module 210. The feature calculation module 215 is configured to aggregate the plurality of adjacent node features and the plurality of edge features by calculating the average of the plurality of adjacent node features and a plurality of adjacent edge features. The feature calculation module 215 is also configured to calculate the plurality of aggregated adjacent nodes features and the plurality of aggregated edge features for one or more adjacent nodes and adjacent node edges. Further, the feature calculation module 215 is configured to concatenate the plurality of aggregated adjacent nodes features and the plurality of aggregated edge features with the features of the individual adjacent node and the individual edge. In one embodiment, the feature calculation module 215 may generate sensitive data features by using at least one of a graph neural network and a machine learning model.

FIG. 3 is an exemplary embodiment of the representation of an unstructured data form of FIG. 1 in accordance with an embodiment of the present disclosure. The unstructured forms have a partially consistent structure. Enterprises may have many forms from customers such as application forms, loan forms, or any other such form which requires them to enter their sensitive data. The present disclosure is applied to the unstructured data. The sensitive data is used in both the unstructured form and unstructured natural text to highlight the contextual information that may be helpful to classify the sensitive data to be true positive or false positive data. Considering an example of the unstructured form, the name-sensitive data "Dean" is right next to another name-sensitive data "Scharmen", and a name anchor sensitive data "Loan Account Name". Another example is the financial institution sensitive data "Bank of America Corp." is near an "ABA routing number" sensitive data "265473825k". In these examples, all sensitive data may have anchors nearby. The unstructured form data may be considered as the following data source-specific features:

Visual for either the entire document, page, chunk, or features that vary with location in the chunk
- Continuous representation capturing layout, such as where there is whitespace, characters, or sensitive data, as built by, for example, an autoencoder.
- Simple descriptors such as local text or sensitivity data density.
- How much of the surrounding area is background text, anchor text, or field data.

Text for either the entire document, page, chunk, or features that vary with location in the chunk
- Meaning of the content, such as does it relate more to a particular type of sensitive data as given by the sensitive data around that region
- Continuous representation capturing a summary of the content, possibly of just in that area or of the entire chunk
- Word vector averaging
- Language modeling, including BERT and such built-over indicator functions for word or pertain word vectors
- Per token or sentence continuous representations
- Word vectors
- Outputs of different layers of a language model
- Features indicating if the token is also considered sensitive data and the type of sensitive data.

In one embodiment, the data source, may be converted into a computer-understandable representation before applying model on the data source. In another embodiment, the system (100) may take the sensitive data extracted along from the data source and uses the sensitive data for converting into a machine learnable representation. The sensitive data is either as a static list obtained from scanning the data source beforehand or as a stream being generated dynamically as the data source is being scanned. Some of the sensitive data obtained from the scanning may be the invalid sensitive data. The data source information such as text may be useful in unstructured natural text cases where, having a natural language understanding of the document is critical to understanding the sensitive data. This is also useful in unstructured form cases to better understand the sensitive data and its relationships with the context. The output of the classification on the unstructured natural text may be the sensitive data features that represent single elements of the personal data, their adjacent personal data, and the relationships with their adjacent sensitive data.

The approach below may be carried out using a graph neural network or any machine-learning model that explicitly or implicitly represents the raw data or features of that data as a graph. Considering a target sensitive data as a node and generate the following categories of features which contain the information of the node itself and its neighborhood:

Node features: These are features which represent the attribute regarding the sensitive data.

Neighboring node features: These are features which represent the attribute regarding the adjacent sensitive data of the sensitive data. The adjacent sensitive data may be both target detections (such as a name detection) and anchor detectors (such as a name anchor detection).

Edge features: These are features which represent the attribute regarding the sensitive data node and its adjacent sensitive data nodes. The adjacent sensitive data can be both target detections (such as a name detection) and anchor detectors (such as a name anchor detection).

Examples for the sensitive feature types mentioned above are:

Node Features:
- a Distance between this node and its closest neighboring node
- Uniqueness and identifiability score for the node based on its type
- Is the node a last name
- Is the node a first name
- Is the node a part of a name
- is the node a street name
- Is the node a city name
- Is the node a province name
- Is the node a postal code
- Is the node a country name
- Is the node a contact phone number
- Is the node a contact email address
- Is the node near its anchor
- Is the sensitive data type of the node typically unique Neighboring Node Features:
- Is the node a target detection
- Is the node a contact phone number
- Is the node a contact email address
- Is the node name category and a target detection
- Is the node geo category and a target detection
- Is the node name category and an anchor detection
- Is the node geo category and an anchor detection
- These features are calculated for k (for example, k=7) nearest adjacent nodes individually, they are then concatenated.
- These features are also averaged to generate the aggregated adjacent nodes features: Calculate the aggregated adjacent nodes features for multiple k (for example, k=3 and 7) and concatenate them. They are then concatenated with the features of the individual adjacent nodes.

Edge Features:
- Do they (node and its adjacent node) have the same detection type, such as "last name"
- Do they have the same detection category, such as "name"
- Do they have the same text
- Do they have the same origin, for example, "Dean" and "Scharmen" in the Unstructured form example have the same origin, however, "Dean" and "Paul" don't have the same origin
- These features are calculated for k (for example, k=7) nearest node-neighboring node edge individually, they are then concatenated.
- These features are also averaged to generate the aggregated edge features. We calculate the aggregated edge features for multiple k (for example, k=3 and 7) and concatenate them. They are then concatenated with the features of the individual edges.

FIG. 4 is an exemplary embodiment of the representation of an unstructured natural text data of data source which has no consistent structure as form templates files of FIG. 1 in accordance with an embodiment of the present disclosure. In some cases, all sensitive data may not have an anchor nearby. In such cases other adjacent nodes may be used. For example, in the unstructured natural text example, the first name sensitive data "Michael" has no anchors, however, it is near a middle name sensitive data "O", and a last name sensitive data "Leavitt". These examples highlight that contextual information may be used to classify the sensitive data to be valid or invalid and filter out the invalid sensitive data. The unstructured natural text, may be considered as the following features:
- Continuous representation capturing a summary of the content, possibly of just in that area or of the entire chunk
- Word vector averaging
- Language modeling, including BERT and such built-over indicator functions for word or pertain word vectors
- Per token or sentence continuous representations
- Word vectors
- Outputs of different layers of a language model
- Features indicating if the token is an also considered sensitive data and the type of sensitive data.

Figure 5:
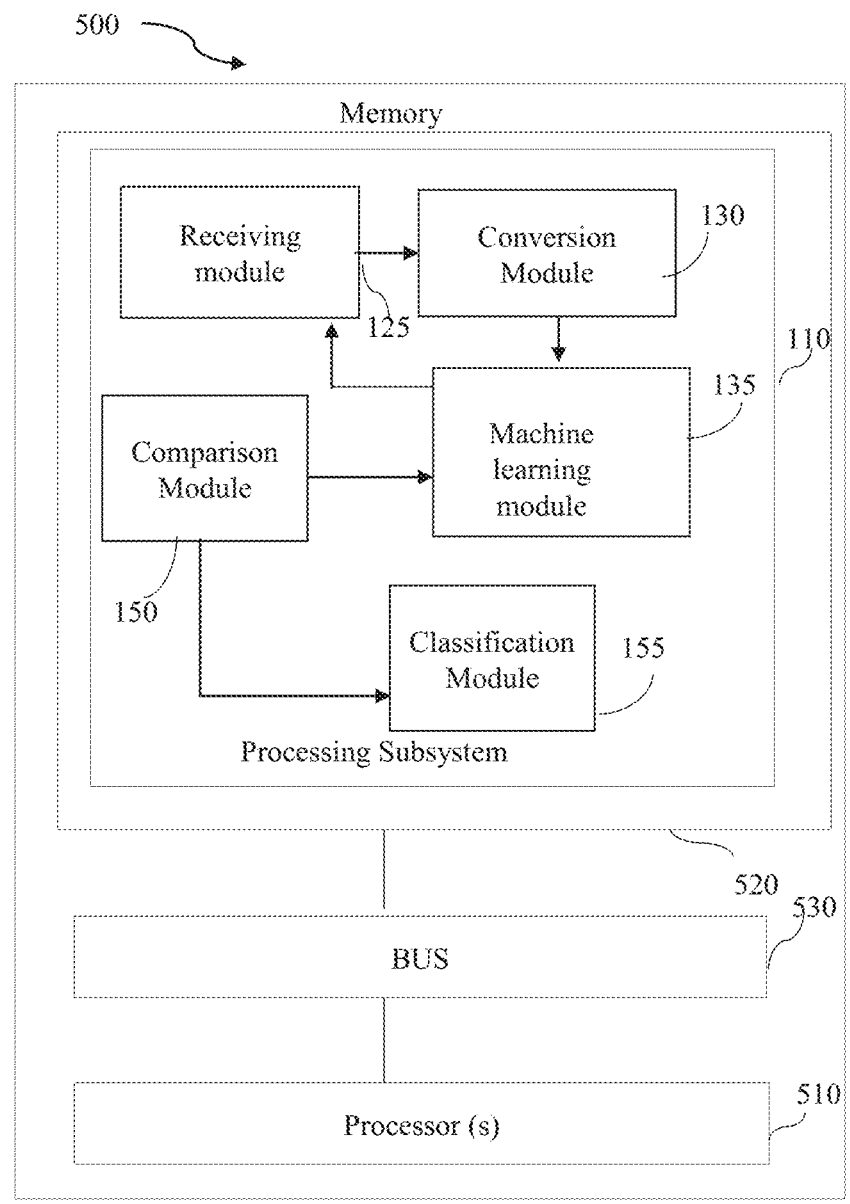
FIG. 5 is a block diagram of a computer or a server in accordance with an embodiment of the present disclosure.

FIG. 5 is a block diagram of a computer or a server 500 in accordance with an embodiment of the present disclosure. The server 500 includes processor(s) 510, and memory 520 operatively coupled to the bus 530. The processor(s) 510, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 520 includes several subsystems stored in the form of computer-readable medium which instructs the processor to perform the method steps illustrated in FIG. 1. The memory 520 is substantially similar to system 100 of FIG. 1. The memory 520 has the following subsystems: the processing subsystem 110 including the receiving module 125, a conversion module 130, a machine learning module 135, a comparison module 150 and a classification module 155. The plurality of modules of the processing subsystem 110 performs the functions as stated in FIG. 1 and FIG. 2. The bus 530 as used herein refers to be the internal memory channels or computer network 120 that is used to connect computer components and transfer data between them. The bus 530 includes a serial bus or a parallel bus, wherein the serial bus transmit data in bit-serial format and the parallel bus transmit data across multiple wires. The bus 530 as used herein, may include but not limited to, a system bus, an internal bus, an external bus, an expansion bus, a frontside bus, a backside bus, and the like.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

The system includes a processing subsystem 110 hosted on a server 115 and configured to execute on a network 120 to control bidirectional communications among a plurality of modules. processing subsystem 110 includes a receiving module 125 configured to receive an unstructured data file wherein the unstructured data file is a data source with the inconsistent structure of data organized in the form of unstructured forms and unstructured natural text. Further, the processing subsystem 110 includes a conversion module 130 operatively coupled to the receiving module 125. The conversion module 130 is configured to convert the unstructured data file into a machine-readable format. The processing subsystem 110 also includes a machine learning module 135 operatively coupled to the conversion module 130. The processing subsystem also includes comparison module 150 operatively connected to the feature calculation module 215, wherein the comparison module 150 is configured to compare the distance of the sensitive data from all of the adjacent sensitive data to calculate the nearest adjacent sensitive data and select the plurality of adjacent node features. Moreover, the processing subsystem 110 includes a classification module 155 operatively coupled with the feature generation module 210, wherein the classification module 155 is configured to classify the sensitive data and predicts the sensitive data to be a true positive or false positive sensitive data by using machine learning, in response to receiving the generated sensitive data from the feature generation module 210. The false positive sensitive data is filtered out and the true positive personal represents accurate sensitive data.

Computer memory elements may include any suitable memory devices(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 510.

Figure 6A:
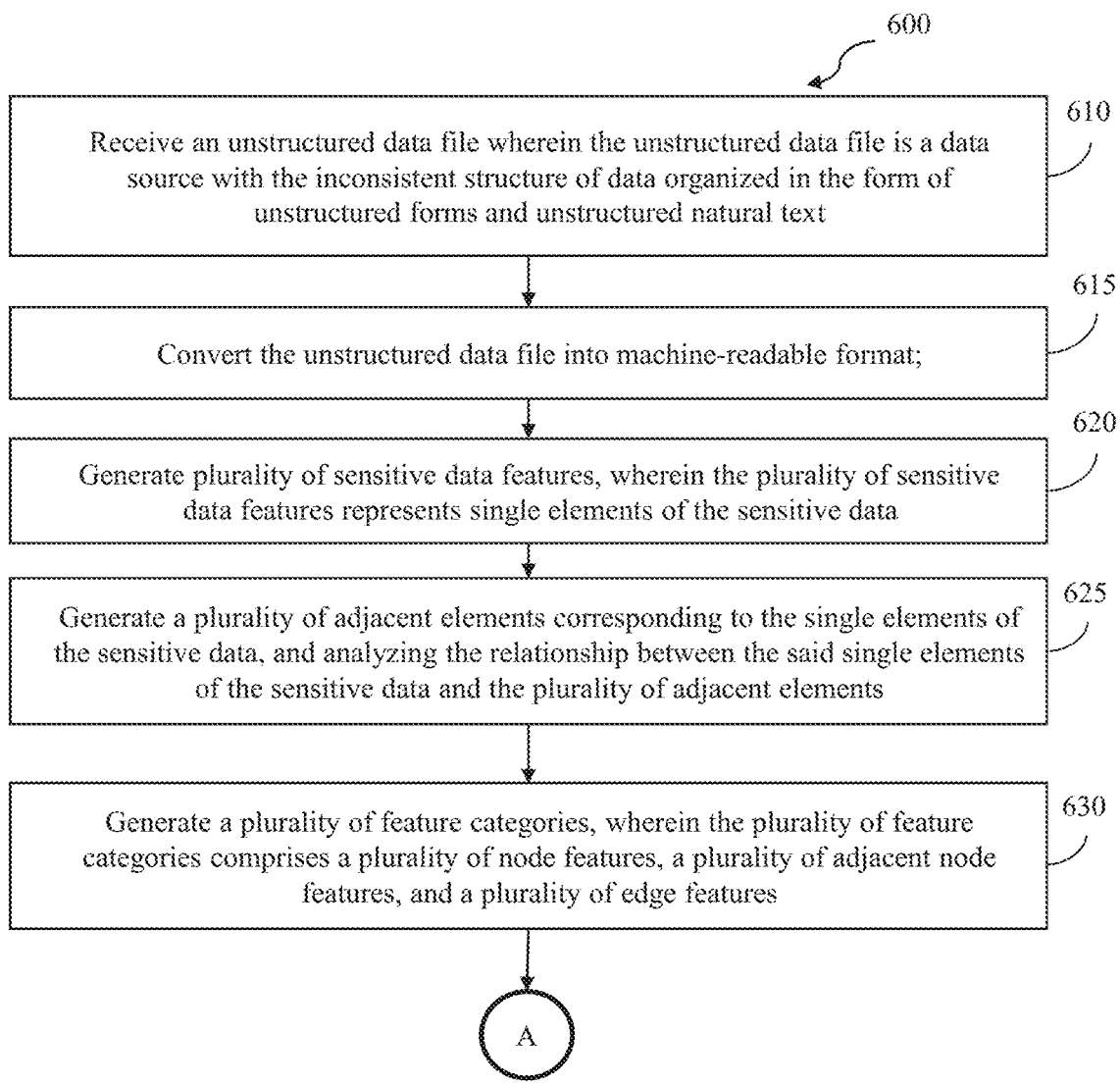
FIG. 6 (*a*) illustrates a flow chart representing the steps involved in a method for the classification of sensitive data elements in accordance with an embodiment of the present disclosure.
Figure 6B:
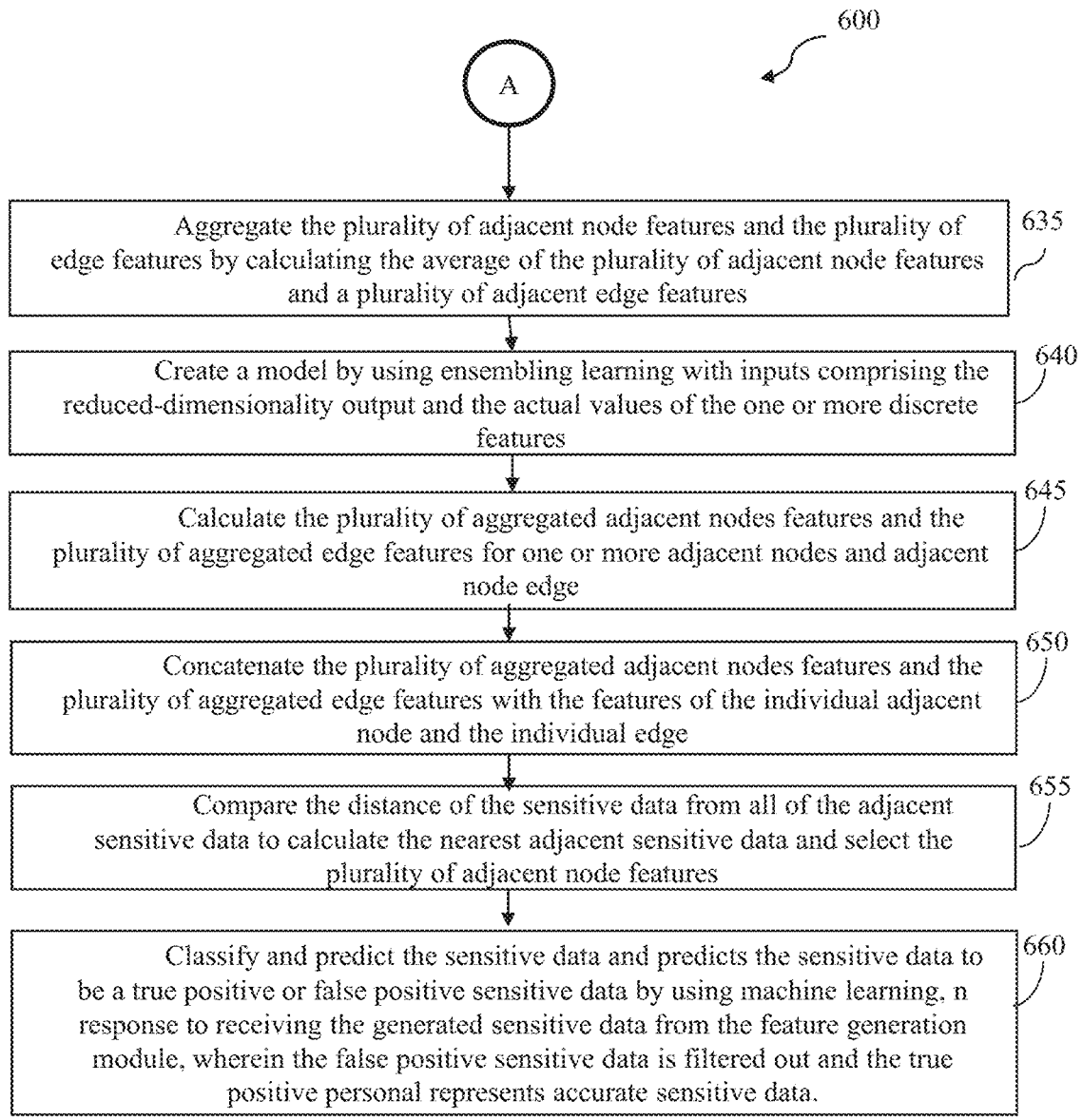

FIG. 6 (a) illustrates a flow chart representing the steps involved in a method 600 for classification of sensitive data elements in accordance with an embodiment of the present disclosure. FIG. 6 (b) illustrates continued steps of the method 600 for the classification of sensitive data of FIG. 6 (a) in accordance with an embodiment of the present disclosure.

The method 600 starts at step 610.

At step 610, an unstructured data file is received by a receiving module of a processing subsystem, wherein the unstructured data file is a data source with an inconsistent structure of data organized in the form of unstructured forms and unstructured natural text.

At step 615, the unstructured data file is converted into a machine-readable format.

At step 620, a plurality of sensitive data features is generated by a feature generation module of the processing subsystem, wherein the plurality of sensitive data features represents single elements of the sensitive data. The method also includes extracting the sensitive data from the data file and converting the extracted data into machine-learnable representation.

At step 625, a plurality of adjacent elements is generated by a feature generation module of the processing subsystem, corresponding to the single elements of the sensitive data, and analyzing the relationship between the said single elements of the sensitive data and the plurality of adjacent elements.

At step 630, a plurality of feature categories is generated by a feature generation module of the processing subsystem, wherein the plurality of feature categories includes a plurality of node features, a plurality of adjacent node features, and a plurality of edge features.

At step 635, the plurality of adjacent node features and the plurality of edge features are aggregated by a of the processing subsystem, by calculating the average of the plurality of adjacent node features and a plurality of adjacent edge features. The method also includes, determining the adjacent node features includes using k-adjacent node individually. The method also includes calculating features for each node and calculating an average of the adjacent features to generate the aggregated adjacent nodes features. Further, the method also includes calculating the aggregated adjacent nodes features for a plurality of k and concatenate. Furthermore, the method includes concatenating, the calculated aggregated adjacent node features with the features of the individual adjacent nodes.

At step 640, the plurality of aggregated adjacent nodes features, and the plurality of aggregated edge features are calculated by a feature calculation module of the processing subsystem, for one or more adjacent nodes and adjacent node edge At step 645, the plurality of aggregated adjacent nodes features, and the plurality of aggregated edge features are concatenated, by a feature calculation module of the processing subsystem, with the features of the individual adjacent node and the individual edge At step 650, the distance of the sensitive data from all of the adjacent sensitive data is compared, by a comparison, module of the processing subsystem, to calculate the nearest adjacent sensitive data and select the plurality of adjacent node features.

At step 655, the sensitive data is classified and predicted, by a classification module of the processing subsystem, to be a true positive or false positive sensitive data by using machine learning, in response to receiving the generated sensitive data from the feature generation module, wherein the false positive sensitive data is filtered out and the true positive personal represents accurate sensitive data. The method also includes predicting the converted sensitive data for correctly predicted node features.

The computer-implemented method ends at step 655.

Figure 7:
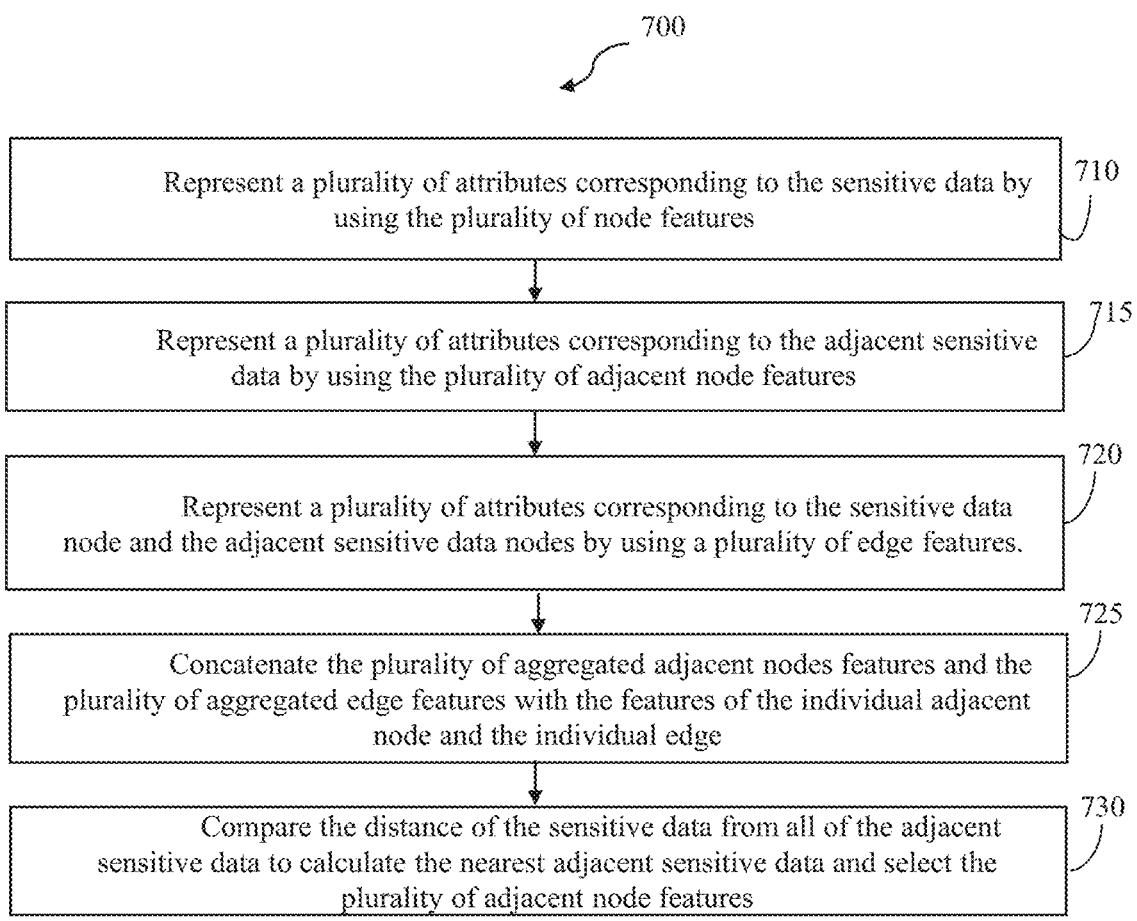
FIG. 7 illustrates steps of the method for the for classification of sensitive data using a machine learning model of in accordance with an embodiment of the present disclosure.

FIG. 7 illustrates steps of the method 700 for the for classification of sensitive data using a machine learning model of in accordance with an embodiment of the present disclosure.

The method 700 starts at step 710.

At step 710, a plurality of attributes is represented corresponding to the sensitive data by using the plurality of node features. In one embodiment, the target sensitive data, a node is assigned to the plurality of node features, wherein the plurality of node features includes an information of the node and the information of the adjacent node. The method also includes generating a graph by using a graph neural network for representing a plurality of raw features of the sensitive data as a graph.

At step 715, a plurality of attributes is represented corresponding to the adjacent sensitive data by using the plurality of adjacent node features. In one embodiment, the plurality of adjacent nodes provides target sensitive data detection and anchor detection, wherein the anchor detection processes entire file at once and enabling real-time feature detection At step 720, a plurality of attributes is represented corresponding to the sensitive data node and the adjacent sensitive data nodes by using a plurality of edge features.

Various embodiments of the system and the method for classification of the sensitive data in a file described above, enable various advantages. Currently, the privacy needs of the enterprises need to be sifted through large corpora of documents and extract all the personal information. The system and method disclosed in the present disclosure provide less processing on a file to classify the sensitive data. Also, the system and the method in the present disclosure provide automated file processing. The system and method in the present disclosure provide accuracy in classifying the sensitive data. The system and the method provide scalability as the system automatically to read the files and filter out invalid sensitive data.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for classifying sensitive data elements in a file using machine learning, wherein the system comprises:
one or more hardware processors;
a memory coupled to the one or more hardware processors, wherein the memory comprises a plurality of subsystems in form of programmable instructions executable by the one or more hardware processors, and wherein the plurality of subsystems comprises:
a processing subsystem hosted on a server, and configured to execute on a network to control bidirectional communications among a plurality of modules comprising:
a receiving module configured to receive an unstructured data file wherein the unstructured data file is a data source with the inconsistent structure of data organized in the form of unstructured forms and unstructured natural text;
a conversion module operatively coupled to the receiving module wherein the conversion module is configured to convert the unstructured data file into machine-readable format;
a machine learning module operatively coupled to the conversion module wherein the machine learning module comprises:
a feature generation module operatively coupled with the receiving module and configured to:
generate a plurality of sensitive data features, wherein the plurality of sensitive data features represents single elements of the sensitive data;
generate a plurality of adjacent elements corresponding to the single elements of the sensitive data, and analyze the relationship between the said single elements of the sensitive data and the plurality of adjacent elements; and
generate a plurality of feature categories, wherein the plurality of feature categories comprises a plurality of node features, a plurality of adjacent node features, and a plurality of edge features;
a feature calculation module operatively coupled to the feature generation module, wherein the feature calculation module is configured to:
aggregate the plurality of adjacent node features and the plurality of edge features by calculating the average of the plurality of adjacent node features and a plurality of adjacent edge features;
calculate the plurality of aggregated adjacent nodes features and the plurality of aggregated edge features for one or more adjacent nodes and adjacent node edge; and
concatenate the plurality of aggregated adjacent nodes features and the plurality of aggregated edge features with the features of the individual adjacent node and the individual edge;
a comparison module operatively connected to the feature calculation module, wherein the comparison module is configured to compare the distance of the sensitive data from all of the adjacent sensitive data to calculate the nearest adjacent sensitive data and select the plurality of adjacent node features; and
a classification module operatively coupled with the feature generation module, wherein the classification module is configured to:
classify the sensitive data and predicts the sensitive data to be a true positive or false positive sensitive data by using machine learning, in response to receiving the generated sensitive data from the feature generation module, wherein the false positive sensitive data is filtered out and the true positive personal represents accurate sensitive data.

2. The system according to claim 1, comprises a sensitive data feature generation module configured to generate sensitive data features by analysing the distance between the node text and the adjacent node text, wherein the adjacent node text acts as an anchor for the node and the edge features.

3. The system according to claim 2, wherein the sensitive data feature is a true positive sensitive data provided that the sensitive data feature is a security number type and is associated with the anchor.

4. The system according to claim 1, wherein the receiving module is configured to receive at least one of the static sensitive data, the dynamic sensitive data, and the data source information.

5. The system according to claim 1, wherein the feature generation module, feature calculation module, comparison module, and classification module generates sensitive data features by using at least one of a graph neural network and a machine learning model.

6. The system according to claim 1, wherein the feature generation module generates a plurality of node features by analysing the uniqueness and an identifiability score for each of the nodes based on the node type, wherein the identifiability score represents correctness of the estimation of the node features.

7. The system according to claim 1, wherein the plurality of node features, the plurality of adjacent node features, and the plurality of edge features are concatenated into a one-dimensional feature vector, and wherein the feature vector is a vector containing multiple elements corresponding to the sensitive data feature.

8. The system according to claim 1, classifies the sensitive data from the entire document, page, chunks, and features.

9. The system according to claim 1, wherein the plurality of edge features represents a plurality of attributes regarding the sensitive data node and related adjacent sensitive data nodes.

10. The system according to claim 1, wherein the adjacent sensitive data targets data detection such as name detection and anchor detection such as a name anchor detection.

11. The system according to claim 1, wherein the machine learning module comprises a plurality of machine learning rules, wherein the machine learning rules are configured to:
determine the probability associated with the prediction of a sensitive data relating to a file; and
classify the file as containing sensitive data, based on the determined probability.

12. A method for classifying sensitive data elements in a file, the method comprises:
receiving, by a receiving module of a processing subsystem comprising: one or more hardware processors; and
a memory coupled to the one or more hardware processors, wherein the memory comprises a plurality of subsystems in form of programmable instructions executable by the one or more hardware processors, and wherein the plurality of subsystems comprises:

an unstructured data file wherein the unstructured data file is a data source with the inconsistent structure of data organized in the form of unstructured forms and unstructured natural text;

converting, the unstructured data file into machine-readable format;

generating, by a feature generation module of the processing subsystem, a plurality of sensitive data features, wherein the plurality of sensitive data features represents single elements of the sensitive data;

generating, by a feature generation module of the processing subsystem, a plurality of adjacent elements corresponding to the single elements of the sensitive data, and analyzing the relationship between the said single elements of the sensitive data and the plurality of adjacent elements;

generating, by a feature generation module of the processing subsystem, generate a plurality of feature categories, wherein the plurality of feature categories comprises a plurality of node features, a plurality of adjacent node features, and a plurality of edge features;

aggregating, by a feature calculation module of the processing subsystem, the plurality of adjacent node features and the plurality of edge features by calculating the average of the plurality of adjacent node features and a plurality of adjacent edge features;

calculating, by a feature calculation module of the processing subsystem, the plurality of aggregated adjacent nodes features and the plurality of aggregated edge features for one or more adjacent nodes and adjacent node edge;

concatenating, by a feature calculation module of the processing subsystem, the plurality of aggregated adjacent nodes features and the plurality of aggregated edge features with the features of the individual adjacent node and the individual edge;

comparing, by a comparison, module of the processing subsystem, the distance of the sensitive data from all of the adjacent sensitive data to calculate the nearest adjacent sensitive data and select the plurality of adjacent node features; and classifying and predicting, by a classification module of the processing subsystem, the sensitive data and predicts the sensitive data to be a true positive or false positive sensitive data by using machine learning, n response to receiving the generated sensitive data from the feature generation module, wherein the false positive sensitive data is filtered out and the true positive personal represents accurate sensitive data.

13. The method according to claim 12, wherein determining the adjacent node features comprises:

providing k-adjacent node individually;

calculating features for each node and calculating an average of the adjacent features to generate the aggregated adjacent nodes features;

calculating the aggregated adjacent nodes features for a plurality of k and concatenate; and concatenating, the calculated aggregated adjacent node features with the features of the individual adjacent nodes.

14. The method according to claim 12, comprises extracting the sensitive data from the data file and converting the extracted data into machine-learnable representation.

15. The method according to claim 12, comprises predicting the converted sensitive data for correctly predicted node features.

16. A non-transitory computer-readable medium storing a computer program that, when executed by a processor, causes the processor to perform a method for the classification of sensitive data elements in a file, wherein the method comprises:

receiving, by a receiving module of a processing subsystem, an unstructured data file wherein the unstructured data file is a data source with the inconsistent structure of data organized in the form of unstructured forms and unstructured natural text;

converting, the unstructured data file into machine-readable format;

generating, by a feature generation module of the processing subsystem, a plurality of sensitive data features, wherein the plurality of sensitive data features represents single elements of the sensitive data;

generating, by a feature generation module of the processing subsystem, a plurality of adjacent elements corresponding to the single elements of the sensitive data, and analyzing the relationship between the said single elements of the sensitive data and the plurality of adjacent elements;

generating, by a feature generation module of the processing subsystem, generate a plurality of feature categories, wherein the plurality of feature categories comprises a plurality of node features, a plurality of adjacent node features, and a plurality of edge features;

aggregating, by a feature calculation module of the processing subsystem, the plurality of adjacent node features and the plurality of edge features by calculating the average of the plurality of adjacent node features and a plurality of adjacent edge features;

calculating, by a feature calculation module of the processing subsystem, the plurality of aggregated adjacent nodes features and the plurality of aggregated edge features for one or more adjacent nodes and adjacent node edge;

concatenating, by a feature calculation module of the processing subsystem, the plurality of aggregated adjacent nodes features and the plurality of aggregated edge features with the features of the individual adjacent node and the individual edge;

comparing, by a comparison, module of the processing subsystem, the distance of the sensitive data from all of the adjacent sensitive data to calculate the nearest adjacent sensitive data and select the plurality of adjacent node features; and classifying and predicting, by a classification module of the processing subsystem, the sensitive data and predicting the sensitive data to be a true positive or false positive sensitive data by using machine learning, in response to receiving the generated sensitive data from the feature generation module, wherein the false positive sensitive data is filtered out and the true positive personal represents accurate sensitive data.

\* \* \* \* \*